(12) United States Patent
Konings

(10) Patent No.: US 6,964,397 B2
(45) Date of Patent: Nov. 15, 2005

(54) NACELLE CHINE INSTALLATION FOR DRAG REDUCTION

(75) Inventor: Christopher A. Konings, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/622,595

(22) Filed: Jul. 18, 2003

(65) Prior Publication Data

US 2005/0011993 A1 Jan. 20, 2005

(51) Int. Cl.⁷ .............................................. B54C 23/06
(52) U.S. Cl. ......................... 244/199; 244/130; 244/55
(58) Field of Search .............................. 244/130, 53 R, 244/199, 214, 54, 55, 198

(56) References Cited

U.S. PATENT DOCUMENTS

| | | |
|---|---|---|
| 3,744,745 A | 7/1973 | Kerker et al. |
| 4,540,143 A | 9/1985 | Wang et al. |
| 4,655,419 A | 4/1987 | van der Hoeven |
| 4,685,643 A | 8/1987 | Henderson et al. |
| 4,884,772 A | 12/1989 | Kraft |
| 4,966,338 A | 10/1990 | Gordon |
| 5,738,298 A | 4/1998 | Ross et al. |
| 6,126,118 A | 10/2000 | Fujino et al. |
| 6,152,404 A | 11/2000 | Flaig et al. |

FOREIGN PATENT DOCUMENTS

GB 2 144 688 A 3/1985

*Primary Examiner*—Galen Barefoot
(74) *Attorney, Agent, or Firm*—Black Lowe & Graham, PLLC

(57) ABSTRACT

An apparatus and a method for reducing drag over an aircraft wing assembly in operational angle of attack situations are disclosed. The aircraft wing assembly includes a wing and an engine nacelle mounted to the wing. A nacelle chine is mounted on an outboard side of the engine nacelle, and the nacelle chine is configured to reduce drag by redirecting at least a portion of fluid striking a forward end of the aircraft wing assembly such that a vortex is formed over the forward end of the aircraft wing assembly. The chine is coupled to a mounting base configured to be secured to an outer surface of the engine nacelle at a mounting position along an outer surface of the engine nacelle.

47 Claims, 7 Drawing Sheets

NACELLE CHINE INSTALLATION FOR DRAG REDUCTION

FIELD OF THE INVENTION

This invention relates generally to aerodynamics of aircraft and, more specifically, to aircraft wake controls.

BACKGROUND OF THE INVENTION

Air travel has continued to grow in popularity. At the same time, air carriers are serving an ever-growing population. However, while the population wants sufficient services, they may not want to accept consequences which attend provision of those services. To take a common example, as cities grow, suburbs and population centers expand toward the direction of what used to be a remotely located airport. At the same time, to serve the growing population, more flights might be added. Ultimately, people who have moved toward the airport experience some of the noise associated with air travel.

Increased airport noise presents problems. For example, in the late 1980s, the airport serving the city of Charlotte, N.C., added runway capacity to support additional air traffic needed to support the burgeoning community. However, nearby residents did not want to the additional noise that would result from the air traffic taking off from and landing on that new runway. Some of these residents went to court and obtained injunctive relief to prevent the runway from being used. Travelers who flew into and out of Charlotte experienced tremendous delays as a result.

Practically, there is no way to prevent population growth around an airport. Moreover, as a matter of law, it does not matter whether the airport was situated long before a population center ever emerged near the airport—citizens still have at least the right to seek legal relief if the noise amounts to the level of a "public nuisance."

Noise concerns can be reduced if an aircraft is able to climb more steeply upon takeoff. An aircraft able to climb more steeply is able to distance itself more quickly from points on the ground. An aircraft's rate of climb is expressed as a climb gradient $\gamma$ which represents a ratio of the aircraft's lift to the aircraft's drag. FIG. 1A illustrates how an improved climb gradient $\gamma$ improves an aircraft's ability to climb over and away from a populated area. At an airport 100, a first aircraft 110 has a climb gradient $\gamma'$ 120 and a second aircraft 115 has a greater climb gradient $\gamma''$ 125. Because the first aircraft 110 has a lesser climb gradient $\gamma'$ 120 than the climb gradient $\gamma''$ 125 of the second aircraft 115, the first aircraft 110 cannot climb as steeply as the second aircraft 115. As a result, the first aircraft 110 with the lesser climb gradient $\gamma'$ 120 passes more closely over neighboring houses and other structures 140. Because noise is attenuated with distance, from the perspective of occupants of the houses and other structures 140, the second aircraft 115 yields less noise. Accordingly, increasing the climb gradient effectively reduces noise around an airport.

Improving the climb gradient of an aircraft not only can effectively reduce noise around airports, but can yield other benefits. To name one example, an aircraft with an improved climb gradient can carry a larger payload. The Federal Aviation Administration (FAA) mandates that an aircraft must meet a certain minimum climb gradient at take off. As a result, on hot days or at high altitude airports it is not unusual for a carrier to have to offload passengers or luggage in order to meet FAA safety guidelines to be able to depart. By decreasing drag, the denominator of the climb gradient, the climb gradient is increased. For instance, for every reduction of 0.0001 in the drag coefficient, the denominator of the climb gradient, a Model 777 commercial jetliner manufactured by The Boeing Company can carry an additional two-hundred pounds of payload. In other words, for every 0.0001 improvement in the drag coefficient, a Model 777 commercial jetliner can safely carry another average passenger. Thus, improved/reduced drag not only reduces noise around airports, but can allow carriers to operate more efficiently, thereby reducing costs.

FIG. 1B shows a conventional wing assembly 150 having a wing 160, an engine nacelle 170, and an engine nacelle mount 180 securing the engine nacelle 170 to the wing 160. The wing 160 is equipped with a leading edge high lift device 165, such as a flat panel Krueger flap, a variable camber Krueger flap, or a slat which is shown in a deployed position in FIG. 1B. A flow of fluid 190, which in this case is air, strikes a leading edge 195 of the wing assembly 150 in an operational angle of attack situation, such as takeoff, climbing, level flight, and other situations. As the flow of fluid 190 passes around the engine nacelle 170, a turbulent flow 198 results over the wing 160. Such turbulent flow 198 is understood by one ordinarily skilled in the art as occurring in the wake of fluid flow occurring after the fluid flow has passed over a body. This turbulent flow 198 causes drag over the wing 160. As previously described, drag reduces the climb gradient and, thus, results in added noise around airports.

There is an unmet need in the art for reducing noise produced by aircraft around airports. Thus, there is an unmet need for reducing drag. Reducing drag over an aircraft wing can increase the climb gradient of the aircraft, and effectively reduce the noise generated by aircraft around airports. Improved climb gradient can also enable carrying greater payloads.

SUMMARY OF THE INVENTION

Embodiments of the present invention provide an apparatus and a method for reducing drag of an aircraft wing assembly. A chine or vortex control device is disposed on an outer surface of an engine nacelle. Reduction of drag over the wing and nacelle assembly improves the climb gradient of the aircraft, thereby allowing the aircraft to operate so as to reduce noise disturbances caused by the aircraft. Position and shape of the nacelle chine can be optimized to reduce drag for a variety of aircraft wing and nacelle assemblies. For example, the position and shape can be optimized for aircraft with and without leading edge high lift devices and other factors. In addition, while reducing drag, placement and shape of the chine can also be adjusted to reduce drag and increase the lift coefficient.

More particularly, embodiments of the present invention provide an apparatus and a method for reducing drag of an aircraft wing assembly where the aircraft wing assembly includes a wing and an engine nacelle mounted to the wing. Embodiments of the present invention include a nacelle chine mounted on an outboard side of the engine nacelle, the nacelle chine being configured to reduce drag by redirecting at least a portion of fluid striking a forward end of the aircraft wing assembly such that a vortex is formed over the forward end of the aircraft wing assembly. Embodiments of the invention also include a mounting base configured to be secured to an outer surface of the engine nacelle at a mounting position along an outer surface of the engine nacelle. Embodiments of the invention also include a wing assembly incorporating the chine and an aircraft incorporating the chine.

In accordance with other aspects of the invention, size and placement of the nacelle chine are optimized according to the engine and wing combination for reducing drag according to one of modeling and empirical testing. The size and the placement of the nacelle chine suitably are optimized to reduce drag and/or to both reduce drag and increase lift. The chine parameters and the placement configuration can be optimized to reduce drag for a wing equipped with a leading edge high lift device, particularly in cases where the leading edge high lift device does not extend along a forward edge of the wing in a position over a location where the engine is mounted on the wing.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention provide an apparatus and a method for reducing drag of an aircraft wing assembly in operational angle of attack portions of flight where the aircraft wing assembly includes a wing and an engine nacelle mounted to the wing. Embodiments of the present invention include a nacelle chine mounted on an outboard side of the engine nacelle, and the nacelle chine is configured to reduce drag by redirecting at least a portion of fluid striking a forward end of the aircraft wing assembly such that a vortex is formed over the forward end of the aircraft wing assembly. Embodiments of the invention also include a mounting base configured to be secured to an outer surface of the engine nacelle at a mounting position along an outer surface of the engine nacelle. Embodiments of the invention also include a wing assembly incorporating the chine and an aircraft incorporating the chine.

Figure 1A:
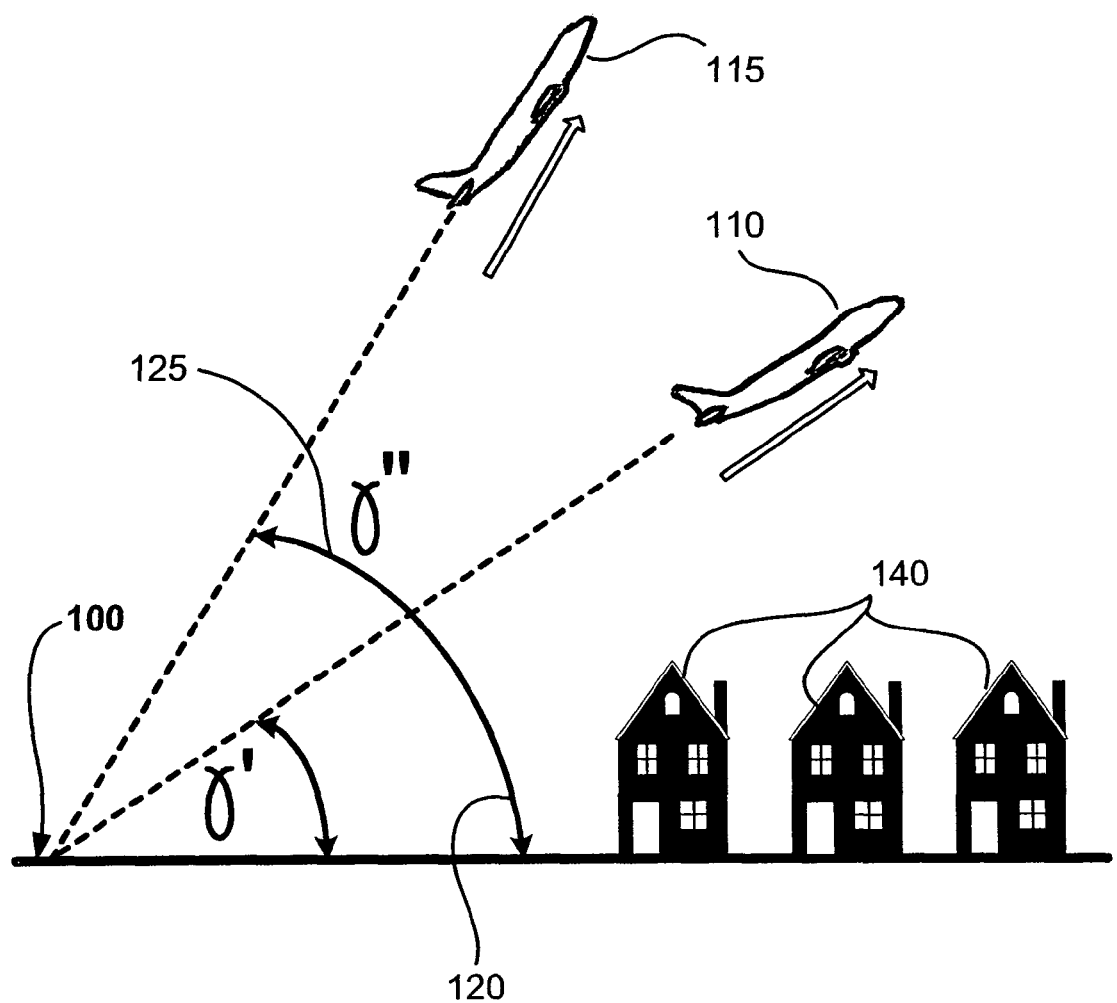
FIG. 1A is a side elevational view of two aircraft with different climb gradients taking off from an airport.
Figure 1B:
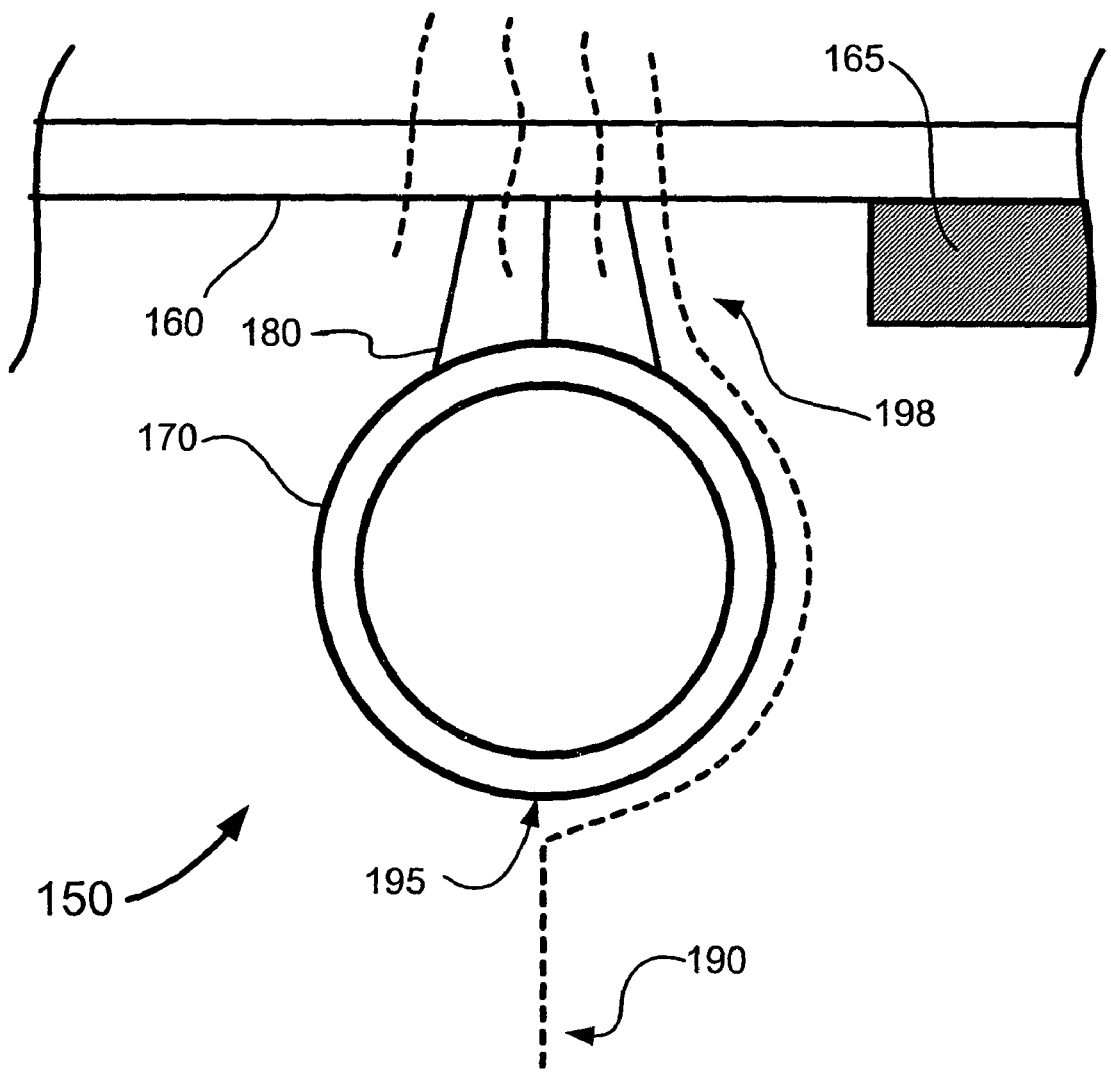
FIG. 1B is a prior art front view of a jet engine mounted to an aircraft wing.
Figure 2:
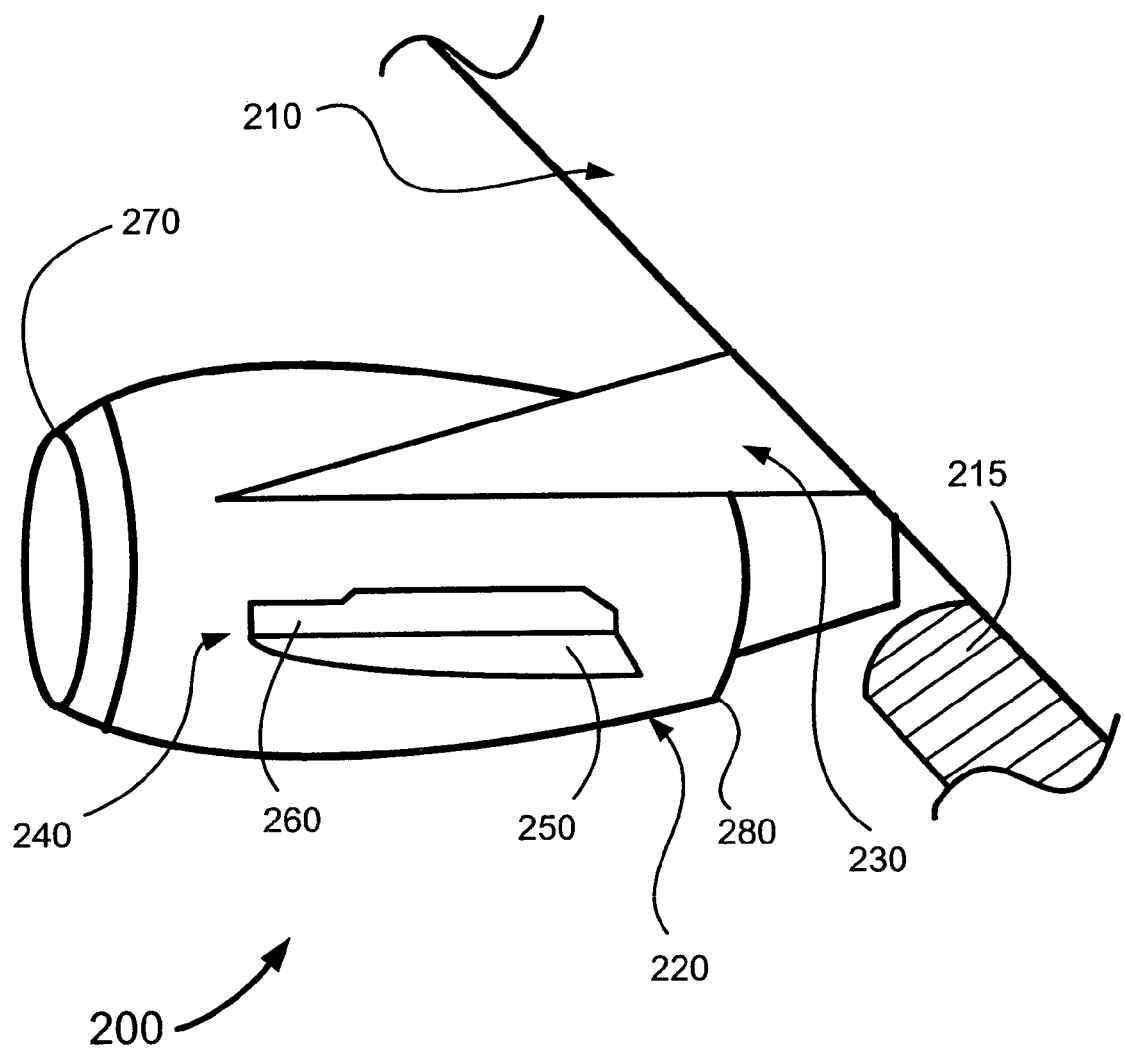
FIG. 2 is a perspective view from above the wing assembly of an engine nacelle equipped with a chine according to an embodiment of the present invention.

FIG. 2 shows a perspective view of a wing assembly 200 using an embodiment of the present invention. The perspective view is taken from a perspective above the wing assembly on an outboard side of an aircraft. Like the prior art wing assembly 100 (FIG. 1), the wing assembly 200 includes a wing 210, an engine nacelle 220, and an engine nacelle mount 230 securing the engine nacelle 220 to the wing 210. Also like the prior wing assembly 100 (FIG. 1), the wing 200 is equipped with a leading edge high lift device 215, such as a flat panel Krueger flap, a variable camber Krueger flap, or a slat which is shown in a deployed position in FIG. 2. The wing assembly 200 shown in FIG. 2 also includes a vortex control device 240 according to an embodiment of the present invention. The vortex control device 240 includes a chine 250 extending outwardly from the engine nacelle 220, as will be further described in connection with FIG. 3. The chine 250 extends from a mounting base 260 which secures the vortex control device 240 to the engine nacelle 220. The vortex control device 240 is mounted on an outboard side of the engine nacelle. As can be seen from FIG. 2, the vortex control device 240 is deployed along a line roughly parallel to that of an axis of an engine (not shown) mounted in the engine nacelle 220. The vortex control device 240 also is positioned behind a leading edge 270 of the engine nacelle 220, but forward of a trailing edge of the engine nacelle 280. Those ordinarily skilled in the art of prior art vortex control devices deployed on engine nacelles directed to changing lift characteristics are familiar with positioning vortex control devices along axes of engines between the leading edge 270 and the trailing edge 280 of an engine nacelle 220. However, as will be further described and appreciated, prior art vortex control devices have been sized and positioned to adjust lift parameters, not to adjust drag and, therefore, noise characteristics.

Figure 3:
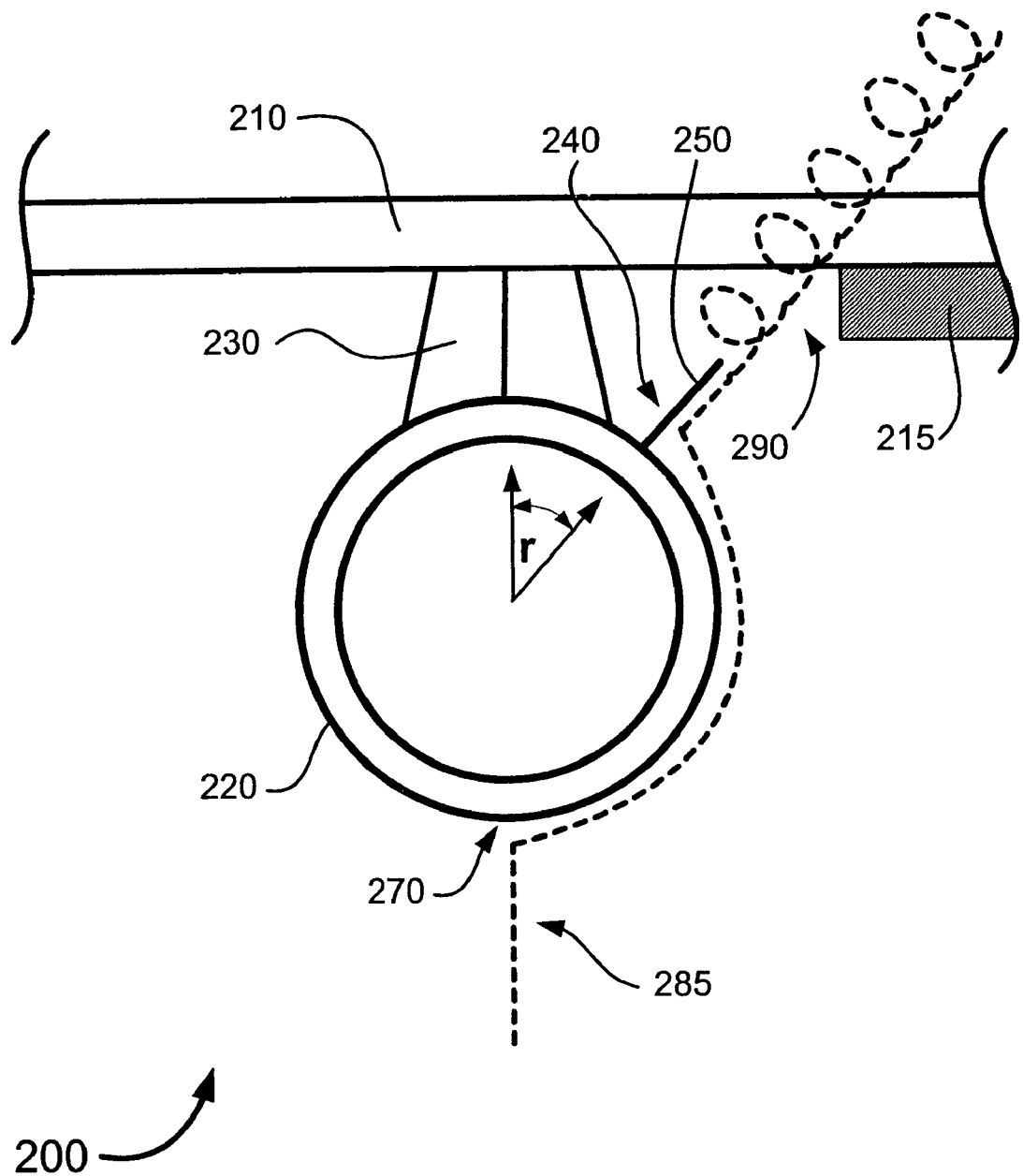
FIG. 3 is a front view of an engine nacelle equipped with a chine according to an embodiment of the present invention.

FIG. 3 shows a front view of the wing assembly 200 using an embodiment of the present invention. Again, the wing assembly 200 includes the wing 210, the engine nacelle 220, and the engine nacelle mount 230 securing the engine nacelle 220 to the wing 210. The wing 200 also is equipped with a leading edge high lift device 215, such as a flat panel Krueger flap, a variable camber Krueger flap, or a slat which is shown in a deployed position in FIG. 3. The vortex control device 240 extends outwardly from the engine nacelle toward the outboard side as previously described. FIG. 3 specifically shows the chine 250, with the mounting base (not shown) being mounted flush to the engine nacelle.

As shown in FIG. 3, a fluid flow of air 285 strikes a leading edge 270 of the engine nacelle. However, unlike in the case of the prior art wing assembly 100 of FIG. 1, the fluid flow 285 strikes the chine 250 instead of flowing around the nacelle 220 and becoming a turbulent flow 160 (FIG. 1). The chine 250 creates an outboard vortex 290 that flows up toward the surface of the wing 210. The vortex 290 is a directed flow of fluid that advantageously results in less drag over the wing assembly 200. Because there is less drag, the climb gradient of an aircraft (not shown in FIG. 3) equipped with the chine 250 has an increased climb gradient. As a result, the aircraft can climb more steeply and thus generate less of a perceived noise disturbance or climb at the same gradient with more payload upon takeoff as previously described.

As is highlighted in FIG. 3, the vortex control device 240 is positioned radially at an angle r between zero degrees and ninety degrees as measured clockwise around an axis of an engine (not shown) mounted in the engine nacelle 220. The angle r preferably is optimized for the wing assembly 200 configuration. Similarly, a length and shape of the chine 250 also are optimized according to the configuration of the wing assembly 200. The wing configuration 200 manifests parameters including wing shape, size, and sweep angle, engine nacelle size and mounting features, presence or absence of a leading edge high lift device 215, such as flat panel Krueger flaps, variable camber Krueger flaps, or slats, extension of a leading edge high lift device across an entire surface of the wing or whether a gap is left over a nacelle, and other factors. Some or all of these factors can contribute to the aerodynamics of the wing assembly 200 and, therefore, may affect what is an optimal shape and/or placement of the chine on the engine nacelle 220.

An optimal shape and/or placement for the chine suitably is determined using mathematical modeling and/or wind-tunnel testing for the wing assembly with which the chine will be used. For one non-limiting example, using a 747-400 aircraft manufactured by The Boeing Company with flaps in a Flaps 10 detent takeoff configuration, an optimal size and shape for the chine is an ogive-shaped chine with a base chord of 57 inches and a maximum height of 13 inches. An optimal position for the chine is 50 inches, plus or minus 10 inches, from a leading edge of the nacelle, with a placement angle, angle r (FIG. 3), of 70 degrees with no toe-in of the chine. A larger chine was shown to have increased drag reduction benefits, but increasing chine size can negatively affect other performance characteristics, as will be described below. If the wing or nacelle has a different shape than a 747-400, the wing has a different sweep angle than a 747-400, or other parameters are different, an optimal shape, size, and placement of the chine could vary significantly.

Because it is known in the art to use vortex control devices or chines to improve the maximum lift coefficient of wing assemblies, it should be appreciated that a focus of using a chine according to embodiments of the present invention principally is to reduce drag, not to improve lift. In a vortex control device to improve lift, most positive difference is yielded by a chine on an inboard side of the engine nacelle. However, placement of a chine on the inboard side of the engine results in increased drag over the wing assembly. By contrast, the drag reduction benefit is yielded by placing a chine on an outboard side of the engine, although chines on both sides can have positive lift improvement effects.

Figure 4:
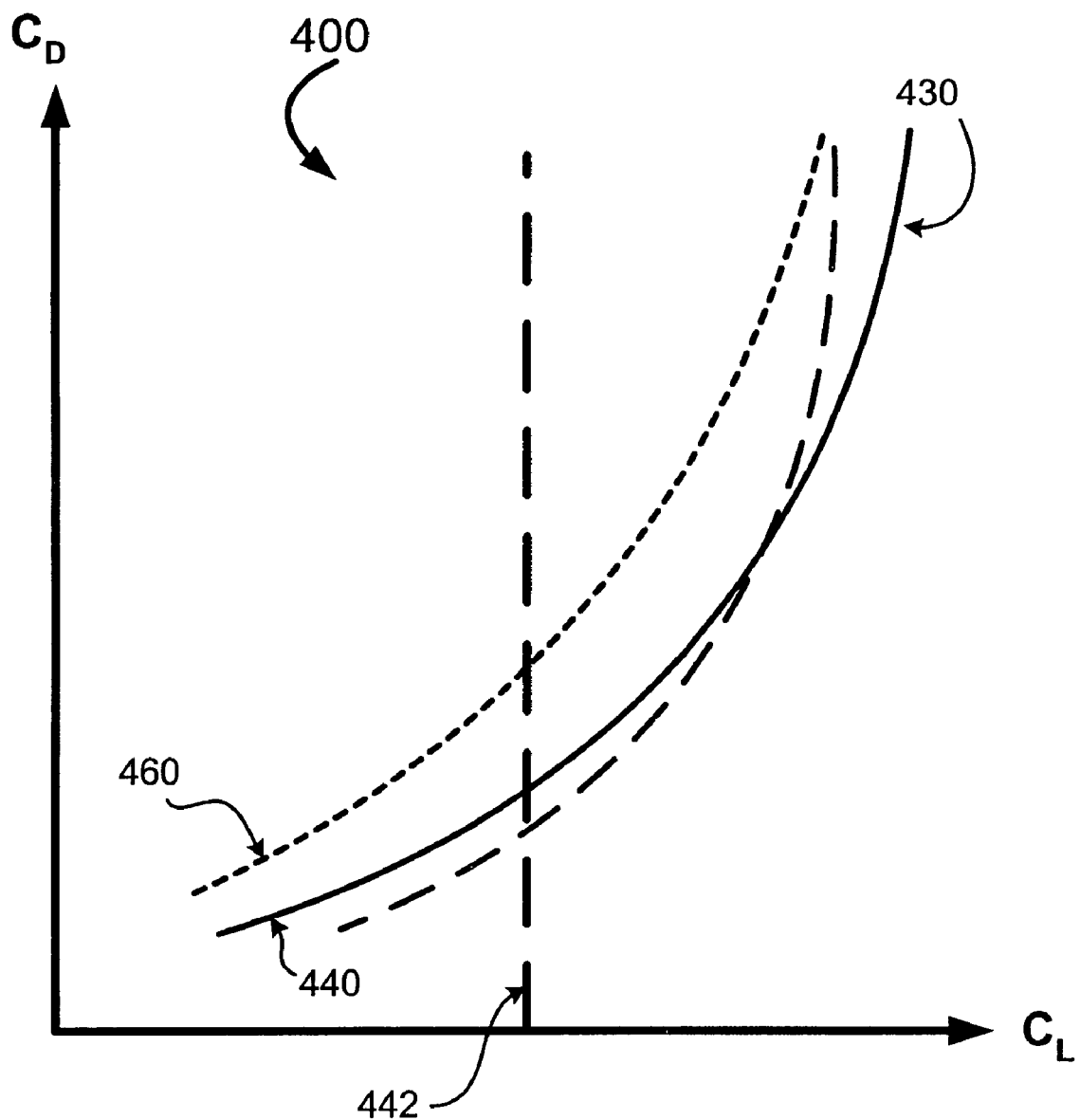
FIG. 4 is a graph showing drag coefficient plotted versus lift coefficient showing an effect of an embodiment of the present invention.

FIG. 4 shows a graph 400 plotting drag coefficient $C_D$ versus lift coefficient $C_L$ for various configurations of a hypothetical wing assembly. High lift coefficients are desirable, while lower drag coefficients are preferred. A first, solid curve 430 represents a plot of drag coefficient $C_D$ versus lift coefficient $C_L$ for a wing assembly using no chines. The solid curve 430 serves as a basis for comparison with wing assemblies using other configurations. A second, dashed curve 440 represents a plot of drag coefficient $C_D$ versus lift coefficient $C_L$ for a wing assembly using an outboard chine shaped and placed to reduce drag. As can be seen by comparing the first curve 430 and the second curve 440, as the lift coefficient $C_L$ is decreased, the wing assembly using the outboard chine exhibits a reduced drag coefficient $C_D$ as compared to the wing assembly using no chines. A dashed line 442 represents an operational lift coefficient $C_L$ and, thus, what $C_D$ and $C_L$ both would be at an operational angle of attack for either type of wing assembly. Accordingly, the graph 400 shows that, at operational angles of attack 442, a wing assembly using an outboard chine has a reduced drag coefficient $C_D$ as compared to a wing assembly using no chines.

For comparison, a third curve 460 shows the drag coefficient $C_D$ and lift coefficient $C_L$ plotted for a wing assembly using only an inboard chine. It will be appreciated that the third curve 460 shows that such a configuration exhibits a higher drag coefficient $C_D$ at every lift coefficient $C_L$ shown. Thus, use of an inboard chine has the effect of increasing drag, which is opposite of the effect advantageously afforded by embodiments of the present invention.

Figure 5:
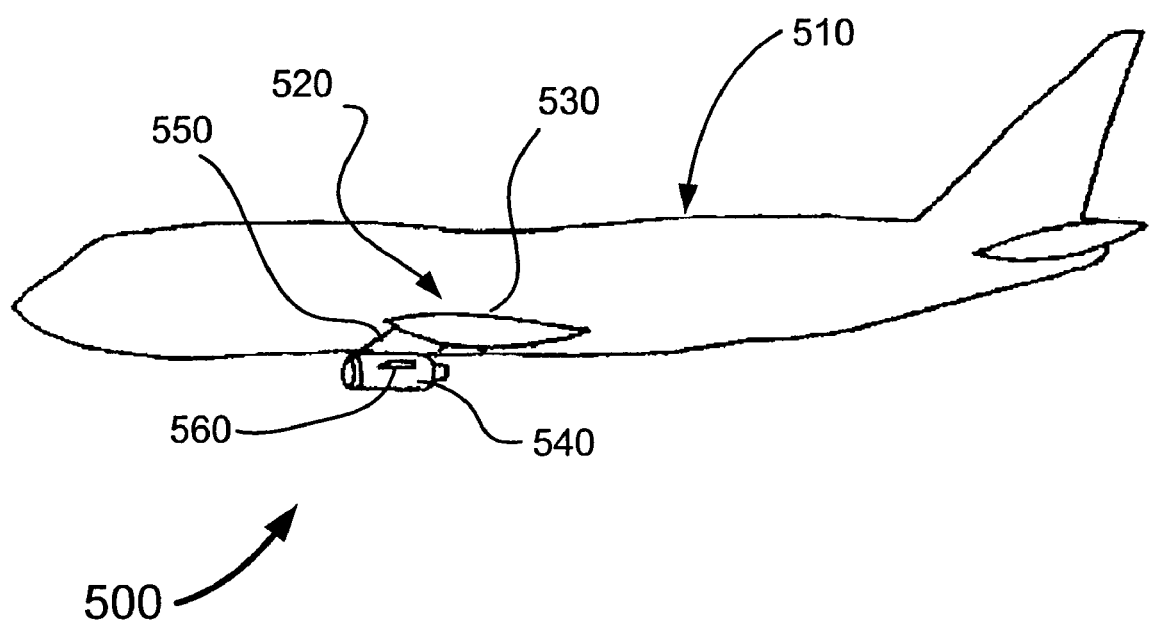
FIG. 5 is a side elevational view of an aircraft equipped with an embodiment of the present invention.

FIG. 5 is a side elevational view of an aircraft 500 using an embodiment of the present invention. The aircraft 500 has a fuselage 510 which supports a wing assembly 520. The wing assembly 520 includes the wing 530 and a plurality of engine nacelles 540, one which one is shown in FIG. 5. The engine nacelle 540 is mounted to the wing 530 by an engine nacelle mount 550. A chine 560 is mounted on an outboard side of the engine nacelle 540. The chine 560 is sized, shaped, and mounted as previously described in connection with FIGS. 2 and 3. As previously described, chines 560 suitably are mounted on a plurality of engine nacelles 540, and on the inboard and outboard sides as desired.

The aircraft 500 shown in FIG. 5 is generally representative of a commercial passenger aircraft, including, for example, the 737, 747, 757, 767, and 777 models commercially-available from The Boeing Company. The apparatus and methods disclosed herein, however, may also be employed in any other types of aircraft including those described, for example, in The Illustrated Encyclopedia of Military Aircraft by Enzo Angelucci, published by Book Sales Publishers, September 2001.

Figure 6:
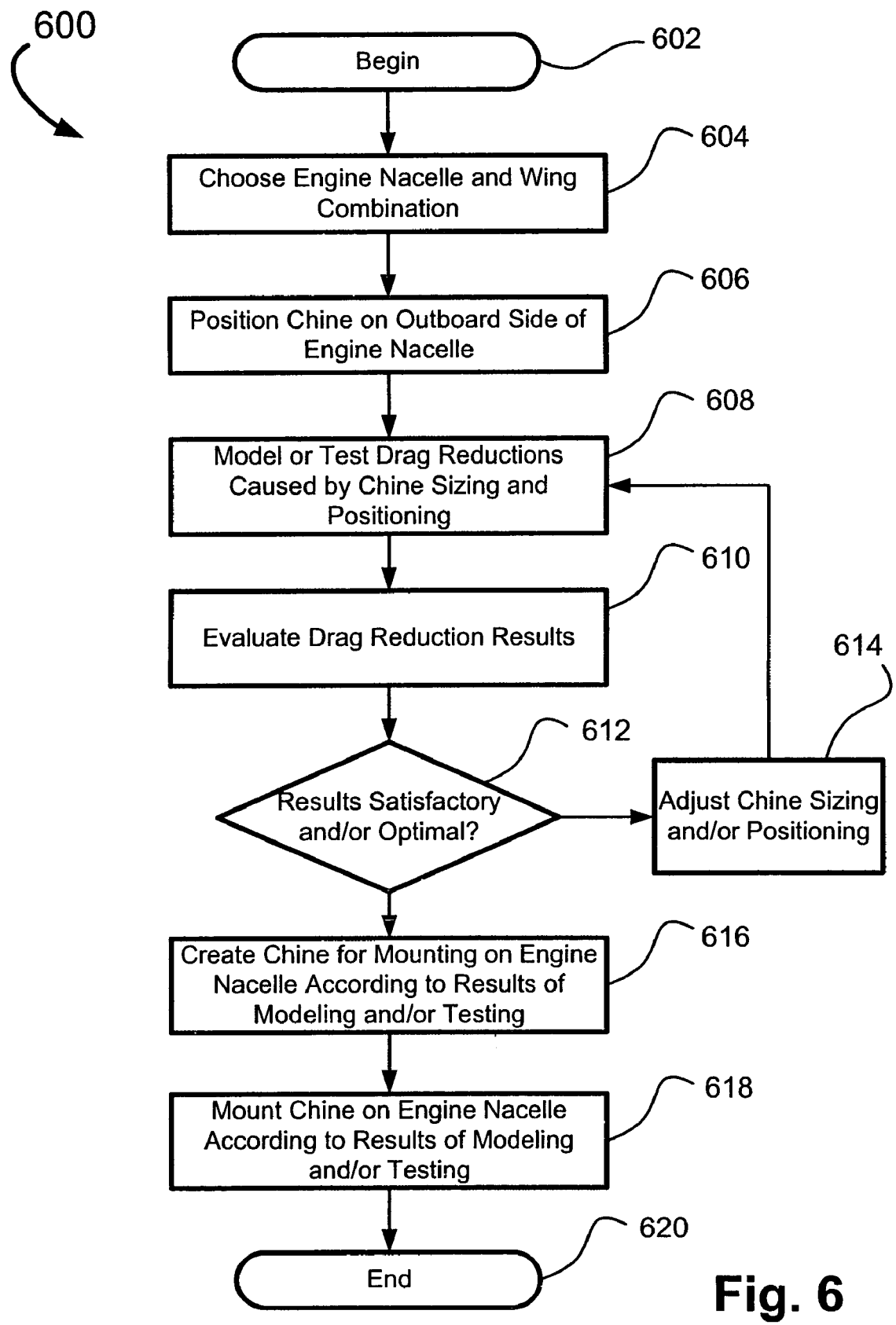
FIG. 6 is a flowchart of a method using an embodiment of the present invention.

FIG. 6 shows a routine 600 for determining a chine position and size to reduce drag and mounting the chine on an engine nacelle. The routine 600 begins at a block 602. Optimizing chine position and size to reduce drag is a function of the configuration of the wing assembly. Thus, at a block 604, the wing assembly configuration, including the nacelle and wing combination, are selected. Using empirical testing to determine desired positioning and shaping of the chine, at a block 606 the chine is positioned on an engine nacelle. At a block 608, a drag reduction caused by chine positioning and sizing is measured by modeling and/or testing. For example, wind tunnel testing suitably is used to measure effects on drag resulting from various chine sizes and placements. At a block 610, drag and noise reduction results are evaluated. At a decision block 612, it is determined if the results are satisfactory and/or optimal. As previously described, an objective is to decrease the drag coefficient $C_D$ at an operational lift coefficient $C_L$. In keeping with the previous descriptions of airport noise concerns, minimizing the drag coefficient $C_D$ at a takeoff lift coefficient $C_L$ is satisfactory. If the results are not satisfactory or optimal, at a block 614 chine position or shape is adjusted and the routine 600 loops to the block 608 for further modeling or testing. On the other hand, if the results are determined at the block 612 to be satisfactory, at a block 616, a working chine for mounting on an engine nacelle is created. At a block 618, the chine created at the block 616 is mounted on an engine nacelle. The routine 600 ends at a block 620. It will be appreciated that, for multiple engine nacelle wing assemblies, the routine 600 can be repeated for as many engine nacelles are used.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for reducing drag over an aircraft wing assembly in operational angle of attack situations, the aircraft wing assembly including a wing and an engine nacelle mounted to the wing, the apparatus comprising:

a nacelle chine mounted on an outboard side of the engine nacelle adjacent a rearward swept portion of the wing, the nacelle chine being mounted on the engine nacelle at an angular location that is greater than approximately fifty degrees from a vertical axis through the engine nacelle and being configured to reduce drag by redirecting at least a portion of fluid flow proximate the aircraft wing assembly.

2. The apparatus of claim 1, wherein the nacelle chine is mounted at an angular location of approximately 70 degrees from a vertical axis through the engine nacelle.

3. The apparatus of claim 1, wherein size and placement of the nacelle chine are optimized according to an engine and wing combination for reducing drag according to one of modeling and empirical testing.

4. The apparatus of claim 3, wherein the size and the placement of the nacelle chine are determined to reduce drag for a wing equipped with a leading edge high lift device including one of a flat panel Krueger flap, a variable camber Krueger flap, or a slat.

5. The apparatus of claim 4, wherein the leading edge high lift device does not extend along a forward edge of the wing in a position over a location where the engine nacelle is mounted on the wing.

6. An apparatus for reducing drag generated around a wing of an aircraft in an area where an engine is mounted when the aircraft is in operational angle of attack situations, the apparatus comprising:
a mounting base configured to be secured to an outer surface of an engine nacelle at a mounting position along an outer surface of the engine nacelle and along a line parallel with an axis of an engine, the mounting position being made according to a placement configuration specific to an engine and wing combination for reducing drag; and
a chine extending in a substantially perpendicular and planar direction from the mounting base and shaped to create an outboard wake vortex in a fluid flow over a forward surface of the engine nacelle and passing over an outboard surface of the engine nacelle adjacent a rearward swept portion of a wing and the wing to which the engine nacelle is attached, the chine being mounted on the engine nacelle at an angular location that is greater than approximately fifty degrees from a vertical axis through the engine nacelle and having chine parameters including a length along the line substantially parallel with the axis of the engine mounted in the engine nacelle, an outer edge shape at an distal edge away from the mounting base, and a radial length measured from the mounting base to the outer edge according to the placement configuration specific to the engine and wing combination for reducing drag.

7. The apparatus of claim 6, wherein the nacelle chine is mounted on an outboard side of the engine nacelle at an angular location that is approximately seventy degrees from a vertical axis through the engine nacelle.

8. The apparatus of claim 7, wherein the chine parameters and the placement configuration are optimized according to the engine and wing combination for reducing drag according to one of modeling and testing.

9. The apparatus of claim 6, wherein the chine parameters and the placement configuration are determined to reduce drag for a wing equipped with a leading edge high lift device including one of a flat panel Krueger flap, a variable camber Krueger flap, or a slat.

10. The apparatus of claim 9, wherein the leading edge high lift device does not extend along a forward edge of the wing in a position over a location where the engine is mounted on the wing.

11. The apparatus of claim 6, wherein the apparatus is disposed on each of a plurality of engine nacelles on an aircraft having a plurality of engines.

12. A wing assembly for reducing drag in operational angle of attack situations, the wing assembly comprising:
a wing;
an engine nacelle mounted to the wing;
a nacelle chine mounted on an outboard side of the engine nacelle adjacent a rearward swept portion of the wing, the nacelle chine being mounted on the engine nacelle at an angular location that is greater than approximately fifty degrees from a vertical axis through the engine nacelle and being configured to reduce drag by redirecting at least a portion of a fluid flow proximate the aircraft wing assembly.

13. The wing assembly of claim 12, wherein the wing assembly includes a plurality of engine nacelles, each of the engine nacelles being equipped with the nacelle chine and the mounting base.

14. The wing assembly of claim 12, wherein size and placement of the nacelle chine are optimized according to the engine and wing combination for reducing drag according to one of modeling and empirical testing.

15. The wing assembly of claim 14, wherein the size and the placement of the nacelle chine are determined to reduce drag for a wing equipped with a leading edge high lift device including one of a flat panel Krueger flap, a variable camber Krueger flap, or a slat.

16. The wing assembly of claim 15, wherein the leading edge high lift device does not extend along a forward edge of the wing in a position over a location where the engine is mounted on the wing.

17. A wing assembly for reducing drag in operational angle of attack situations, the wing assembly comprising:
a wing;
an engine nacelle mounted to the wing;
a mounting base configured to be secured to an outer surface of an engine nacelle at a mounting position along an outer surface of the engine nacelle and along a line parallel with an axis of an engine, the mounting position being made according to a placement configuration specific to an engine and wing combination for reducing drag; and
a chine extending in a substantially perpendicular and planar direction from the mounting base and shaped to create an outboard wake vortex in a fluid flow over a forward surface of the engine nacelle and passing over an outboard surface of the engine nacelle and adjacent a rearward swept portion of a wing to which the engine nacelle is attached, the chine being mounted on the engine nacelle at an angular location that is greater than approximately fifty degrees from a vertical axis through the engine nacelle and having chine parameters including a length along the line substantially parallel with the axis of the engine mounted in the engine nacelle, an outer edge shape at an distal edge away from the mounting base, and a radial length measured from the mounting base to the outer edge according to the placement configuration specific to the engine and wing combination for reducing drag.

18. The wing assembly of claim 17, wherein the nacelle chine is mounted on an outboard side of the engine nacelle at an angular location of approximately seventy degrees from a vertical axis through the engine nacelle.

19. The wing assembly of claim 18, wherein the chine parameters and the placement configuration are optimized according to the engine and wing combination for reducing drag according to one of modeling and testing.

20. The wing assembly of claim 19, wherein the chine parameters and the placement configuration are determined to reduce drag for a wing equipped with a leading edge high lift device including one of a flat panel Krueger flap, a variable camber Krueger flap, or a slat.

21. The wing assembly of claim 20, wherein the leading edge high lift device does not extend along a forward edge of the wing in a position over a location where the engine is mounted on the wing.

22. The wing assembly of claim 17, wherein the wing assembly includes a plurality of engine nacelles, each of the engine nacelles being equipped with the nacelle chine.

23. An aircraft for reducing drag in operational angle of attack situations, the aircraft comprising:
   a fuselage;
   a wing mounted to the fuselage;
   an engine nacelle mounted to the wing; and
   a nacelle chine mounted on an outboard side of the engine nacelle adjacent a rearward swept portion of the wing, the nacelle chine being mounted on the engine nacelle at an angular location that is greater than approximately fifty degrees from a vertical axis through the engine nacelle and being configured to reduce drag by redirecting at least a portion of a fluid flow proximate aircraft wing assembly.

24. The aircraft of claim 23, wherein the nacelle chine is mounted on an outboard side of the engine nacelle at an angular location that is approximately seventy degrees from a vertical axis through the engine nacelle.

25. The aircraft of claim 23, wherein size and placement of the nacelle chine are optimized according to the engine and wing combination for reducing drag according to one of modeling and empirical testing.

26. The aircraft of claim 25, wherein the size and placement of the nacelle chine are determined to reduce drag for a wing equipped with a leading edge high lift device including one of a flat panel Krueger flap, a variable camber Krueger flap, or a slat.

27. The aircraft of claim 26, wherein the leading edge high lift device does not extend along a forward edge of the wing in a position over a location where the engine is mounted on the wing.

28. An aircraft for reducing drag in operational angle of attack situations, the wing assembly comprising:
   a wing;
   an engine nacelle mounted to the wing;
   a mounting base configured to be secured to an outer surface of an engine nacelle at a mounting position along an outer surface of the engine nacelle and along a line parallel with an axis of an engine, the mounting position being made according to a placement configuration specific to an engine and wing combination for reducing drag; and
   a chine extending in a substantially perpendicular and planar direction from the mounting base and shaped to create an outboard wake vortex in a fluid flow over a forward surface of the engine nacelle and passing over an outboard surface of the engine nacelle adjacent a rearward swept portion of a wing and the wing to which the engine nacelle is attached, the chine being mounted on the engine nacelle at an angular location that is greater than approximately fifty degrees from a vertical axis through the engine nacelle and having chine parameters including a length along the line substantially parallel with the axis of the engine mounted in the engine nacelle, the chine further having an outer edge shape at an distal edge away from the mounting base, and a radial length measured from the mounting base to the outer edge according to the placement configuration specific to the engine and wing combination for reducing drag.

29. The aircraft of claim 28, wherein the nacelle chine is mounted on an outboard side of the engine nacelle at an angular location that is approximately seventy degrees from a vertical axis through the engine nacelle.

30. The aircraft of claim 29, wherein the chine parameters and the placement configuration are optimized according to the engine and wing combination for reducing drag according to one of modeling and testing.

31. The aircraft of claim 30, wherein the chine parameters and the placement configuration are determined to reduce drag for a wing equipped with a leading edge high lift device including one of a flat panel Krueger flap, a variable camber Krueger flap, or a slat.

32. The aircraft of claim 31, wherein the leading edge high lift device does not extend along a forward edge of the wing in a position over a location where the engine is mounted on the wing.

33. The aircraft of claim 28, wherein the wing assembly includes a plurality of engine nacelles, each of the engine nacelles being equipped with the nacelle chine and the mounting base.

34. A method for reducing drag over an aircraft wing assembly in operational angle of attack situations, the method comprising:
   providing an aircraft wing assembly including a wing and an engine nacelle mounted to the wing;
   mounting a nacelle chine on an outboard side of the engine nacelle adjacent a rearward swept portion of the wing at an angular location that is greater than approximately fifty degrees from a vertical axis through the engine nacelle; and
   redirecting at least a portion of a fluid flow proximate a forward end of the aircraft wing assembly.

35. The method of claim 34, wherein mounting a nacelle chine on an outboard side of the engine nacelle includes mounting a nacelle chine on an outboard side of the engine nacelle at an angular location that is approximately seventy degrees from a vertical axis through the engine nacelle.

36. The method of claim 34, wherein size and placement of the nacelle chine are optimized according to the engine and wing combination for reducing drag according to one of modeling and empirical testing.

37. The method of claim 36, wherein the size and the placement of the nacelle chine are determined to reduce drag for a wing equipped with a leading edge high lift device including one of a flat panel Krueger flap, a variable camber Krueger flap, or a slat.

38. The method of claim 37, wherein the leading edge high lift device does not extend along a forward edge of the wing in a position over a location where the engine is mounted on the wing.

39. A method for reducing drag over an aircraft wing assembly in operational angle of attack situations, the method comprising:
   providing an aircraft wing assembly, the aircraft wing assembly including a wing and an engine nacelle mounted to the wing such that fluid striking a forward end of the aircraft wing assembly results in a fluid flow that causes drag;
   providing at least one nacelle chine mounted on an outboard side of the engine nacelle at an angular location that is greater than approximately fifty degrees from a vertical axis through the engine nacelle the nacelle chine having a mounting base and a substantially planar member configured such that when mounted on the outboard side of the engine nacelle adjacent a rearward swept portion of the wing the chine extends substantially perpendicularly outwardly from the surface of the engine nacelle; and sizing and positioning the nacelle chine on the engine nacelle such that a fluid flow proximate the forward end of the aircraft wing is at least partially redirected reduce drag.

40. The method of claim 39, wherein the sizing and the positioning of the nacelle chine includes choosing a length of the nacelle chine in a dimension substantially parallel with an engine axis of an engine and the nacelle chine is not longer than a length of the engine nacelle.

41. The method of claim 39, wherein the sizing and the positioning of the nacelle chine includes shaping a distal edge of the nacelle chine opposite the surface of the engine nacelle such that the distal edge of the nacelle chine facilitates the generating of the vortex but does not interfere with the wing.

42. The method of claim 39, wherein the sizing and the positioning of the nacelle chine includes longitudinally positioning the nacelle chine such that a leading edge of the nacelle chine is rearward of a leading end of the engine nacelle and the trailing end of the nacelle chine is forward of a trailing end of the engine nacelle.

43. The method of claim 39, wherein the sizing and the positioning of the nacelle chine includes sizing and positioning the nacelle chine on an outboard side of the engine nacelle at an angular location that is approximately seventy degrees from a vertical axis through the engine nacelle.

44. The method of claim 39, wherein a single nacelle chine is installed on an outboard side of the engine nacelle on each of a plurality of engines on an aircraft having a plurality of engines.

45. The method of claim 39, wherein the sizing and the positioning of the nacelle chine are optimized according to the engine and wing combination for reducing drag according to one of modeling and empirical testing.

46. The method of claim 39, wherein the chine parameters and the placement configuration are determined to reduce drag for a wing equipped with at least one leading edge high lift device including one of a flat panel Krueger flap, a variable camber Krueger flap, or a slat.

47. The method of claim 46, wherein the leading edge high lift device does not extend along a forward edge of the wing in a position over a location where the engine is mounted on the wing.

* * * * *

US006964397C1

(12) EX PARTE REEXAMINATION CERTIFICATE (6494th)
United States Patent
Konings

(10) Number: US 6,964,397 C1
(45) Certificate Issued: Oct. 28, 2008

(54) NACELLE CHINE INSTALLATION FOR DRAG REDUCTION

(75) Inventor: Christopher A. Konings, Kirkland, WA (US)

(73) Assignee: The Boeing Company, Seattle, WA (US)

Reexamination Request:
No. 90/008,464, Apr. 16, 2007

Reexamination Certificate for:
Patent No.: 6,964,397
Issued: Nov. 15, 2005
Appl. No.: 10/622,595
Filed: Jul. 18, 2003

(51) Int. Cl.
*B64C 3/00* (2006.01)

(52) U.S. Cl. .......................... 244/199; 244/130; 244/55
(58) Field of Classification Search ............... 244/199.1, 244/130, 55; 213/75 R, 62 R, 46 R, 22, 36
See application file for complete search history.

(56) References Cited

U.S. PATENT DOCUMENTS 3,744,745 A * 7/1973 Kerker et al. ............. 244/199.1

OTHER PUBLICATIONS

Navier–Strokes Analysis of High Wing Transport High–Lift Configuration with Externally Blown Flaps AIAA–200–4219 by Slotnick et al., 2000.*

Andre, "Vortex Generators," Smartcockpit.com, pp. 1–5.
"Boeing Winnipeg—Manufacturing", retrieved on Jun. 20, 2006 at <<http://www.boeing.com/commercial/winnipeg/products.htm>>, Boeing, 3 pages.
Gilchrist et al., "Study of Vortices of an S R–71 Blackbird," Department of Aerospace Engineering and Engineering Mechanics, University of Texas at Austin, Dec. 5, 2003, pp. i–23.
Rogers et al., "Computation of Viscous Flow for a Boeing 777 Aircraft in Landing Configuration," AIAA 2000–4221, 18th AIAA Applied Aerodynamics Conference, Aug. 14–17, 2000, Denver, CO, pp. 1–11.
Scott, "Nacelle Vortex Generator," retrieved on Jun. 20, 2002 at <<http://www.aerospaceweb.org/question/aerodynamics/q0255.shtml>>, Aerospaceweb.org, | Ask Us, Dec. 18, 2005, 5 pgs.

* cited by examiner

*Primary Examiner*—Matthew C. Graham

(57) ABSTRACT

An apparatus and a method for reducing drag over an aircraft wing assembly in operational angle of attack situations are disclosed. The aircraft wing assembly includes a wing and an engine nacelle mounted to the wing. A nacelle chine is mounted on an outboard side of the engine nacelle, and the nacelle chine is configured to reduce drag by redirecting at least a portion of fluid striking a forward end of the aircraft wing assembly such that a vortex is formed over the forward end of the aircraft wing assembly. The chine is coupled to a mounting base configured to be secured to an outer surface of the engine nacelle at a mounting position along an outer surface of the engine nacelle.

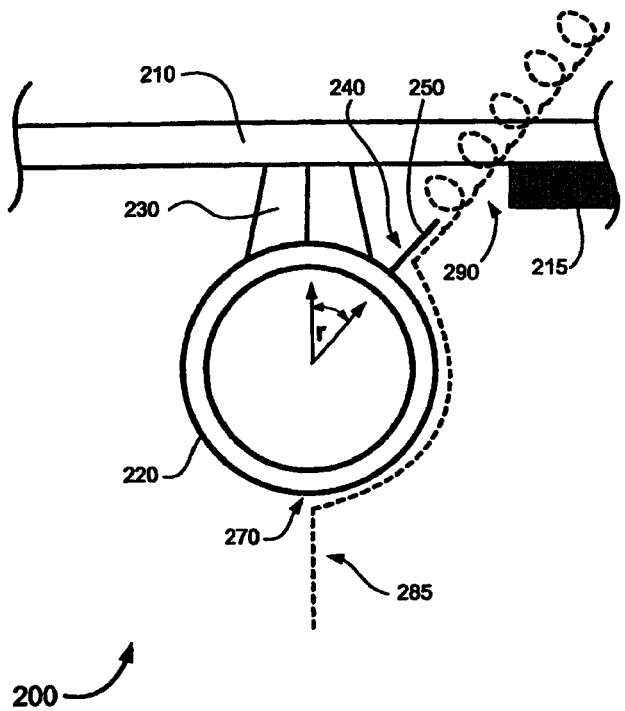

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–5 and 34–38 are cancelled.
Claims 6–33 and 39–47 were not reexamined.

* * * * *